(12) United States Patent
Iijima et al.

(10) Patent No.: US 7,541,712 B2
(45) Date of Patent: Jun. 2, 2009

(54) FUEL PUMP

(75) Inventors: Masaaki Iijima, Gunma (JP); Junichi Motojima, Gunma (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 11/401,232

(22) Filed: Apr. 11, 2006

(65) Prior Publication Data

US 2006/0236985 A1    Oct. 26, 2006

(30) Foreign Application Priority Data

Apr. 21, 2005   (JP)   ............................... 2005-123506

(51) Int. Cl.
*H02K 13/00*   (2006.01)
(52) U.S. Cl. ........................ 310/249; 310/71
(58) Field of Classification Search ............... 310/61, 310/71, 87, 242, 248, 249; 417/366, 388
See application file for complete search history.

(56) References Cited

U.S. PATENT DOCUMENTS

| | | | |
|---|---|---|---|
| 2,737,483 A | 3/1956 | Lowenheim et al. | |
| 4,274,895 A * | 6/1981 | Bascou et al. | ................. 156/53 |
| 4,350,909 A * | 9/1982 | Yamada | ........................ 310/62 |
| 4,626,178 A * | 12/1986 | Terumoto | .................... 417/366 |
| 2002/0140313 A1* | 10/2002 | Noya et al. | .................. 310/233 |
| 2003/0173925 A1* | 9/2003 | Strobl et al. | ................. 318/543 |
| 2003/0185693 A1* | 10/2003 | Iwanari | .................... 417/423.7 |
| 2005/0139003 A1* | 6/2005 | Cochran et al. | ................ 73/313 |
| 2006/0260404 A1* | 11/2006 | Liu et al. | ........................ 73/592 |

FOREIGN PATENT DOCUMENTS

| | | |
|---|---|---|
| DE | 196 39 389 A1 | 3/1997 |
| GB | 2047980 A | 3/1980 |
| GB | 2 047 980 A | 12/1980 |
| JP | 9-154261 A | 6/1997 |

* cited by examiner

*Primary Examiner*—Dang D Le
(74) *Attorney, Agent, or Firm*—Antonelli, Terry, Stout & Kraus, LLP.

(57) ABSTRACT

A fuel pump forming part of a fuel supply system for an automotive internal combustion engine. The fuel pump includes a hollow casing in which a pump section and an electric motor for driving the pump section are disposed. A connector is provided for connecting the electric motor to an external power source, and has a terminal. A brush is slidably contacted with a rotor of the electric motor so as to supply power to a coil of the rotor. A lead wire is provided for electrically connecting the terminal of the connector to the brush. A plating layer of tin is formed on the lead wire by a tin-electroplating.

9 Claims, 3 Drawing Sheets

FUEL PUMP

BACKGROUND OF THE INVENTION

This invention relates to improvements in a fuel pump.

Hitherto, fuel pumps of various types have been proposed. A fuel pump as an example of them is disclosed in Japanese Patent Provisional Publication No. 9-154261.

The fuel pump disclosed in Japanese Patent Provisional Publication No. 9-154261 includes a hollow casing in which a pump section and an electric motor for driving the pump section are disposed.

In the fuel pump of the above type, a terminal of a connector for connecting the electric motor to an external power source can be connected through a lead wire to a brush slidably contacted with a rotor of the electric motor thereby supplying a coil of the rotor with power; however, the lead wire is sometimes sulfidized due to sulfur contained in fuel. Accordingly, there has been a case where a tin-plating or tinning treatment is made on the lead wire in order to protect the lead wire from sulfidation. When the tin-plating or tinning treatment is made on the lead wire for the above reason, a hot dipping method has been conventionally employed. In the hot dipping method, a wire material is immersed in a molten plating material to be coated at its surface with the plating material, and then passed through a die located at an outlet (of the wire material from the plating material) so as to be finished to have a certain plating layer thickness.

SUMMARY OF THE INVENTION

However, drawbacks have been encountered in the above hot dipping method. More specifically, the plating layer thickness obtained in the hot dipping method is difficult to be controlled and dispersed largely. Therefore, a plating layer unavoidably has some portions poor in thickness, so that the lead wire is degraded in durability to sulfidation.

In view of the above, an object of the present invention is to provide an improved fuel pump which can effectively overcome drawbacks encountered in conventional fuel pumps.

Another object of the present invention is to provide an improved fuel pump in which a lead wire fore electrically connecting the terminal of the connector to the brush is improved in durability to sulfidation.

An aspect of the present invention resides in a fuel pump comprising a hollow casing in which a pump section and an electric motor for driving the pump section are disposed. A connector is provided for connecting the electric motor to an external power source, and has a terminal. A brush is slidably contacted with a rotor of the electric motor so as to supply power to a coil of the rotor. A lead wire is provided for electrically connecting the terminal of the connector to the brush. A plating layer of tin is formed on the lead wire by a tin-electroplating.

Another aspect of the present invention resides in a method of producing a fuel pump including a hollow casing, a pump section disposed inside the casing, an electric motor for driving the pump section disposed inside the casing, a connector for connecting the electric motor to an external power source, the connector having a terminal, a brush slidably contacted with a rotor of the electric motor so as to supply power to a coil of the rotor, and a lead wire for electrically connecting the terminal of the connector to the brush. The producing method comprises the step of carrying out a tin-electroplating on the lead wire so as to form a plating layer of tin on the surface of the lead wire.

The other objects and features of this invention will become understood from the following description with reference to the accompanying drawings.

DETAILED DESCRIPTION OF THE INVENTION

Figure 1:
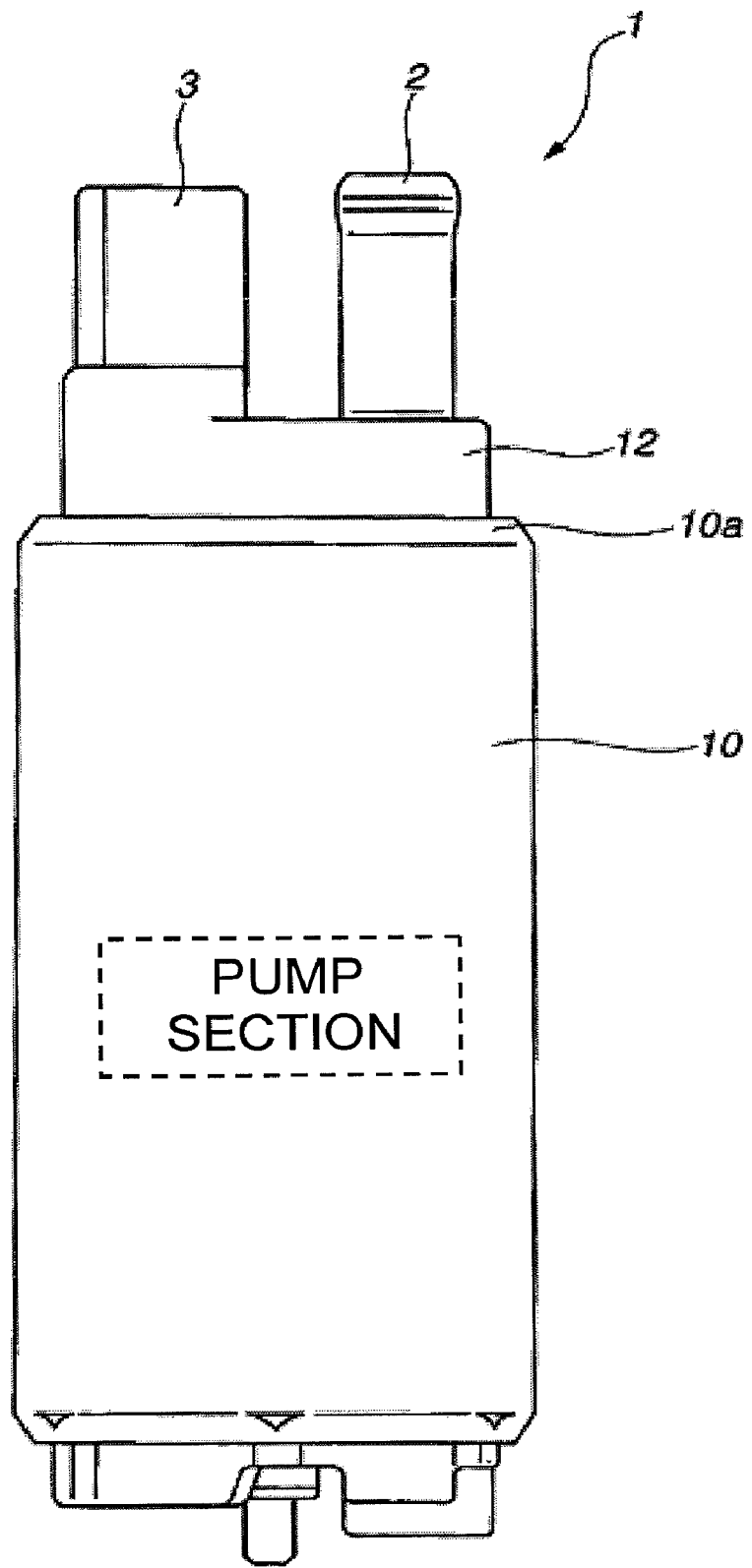
FIG. 1 is a side view of an embodiment of a fuel pump according to the present invention.
Figure 2:
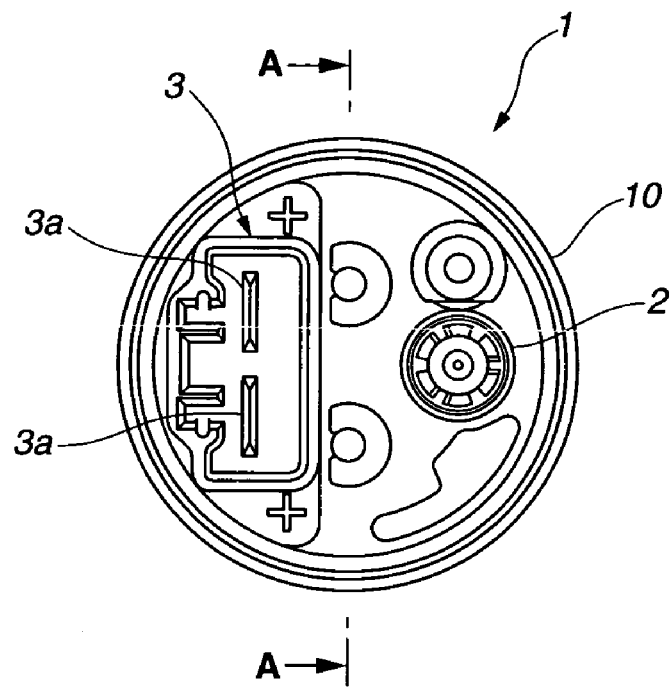
FIG. 2 is a plan view of an end section (or upper end section) of the fuel pump of FIG. 1 which end section is formed with a discharge port.
Figure 3:
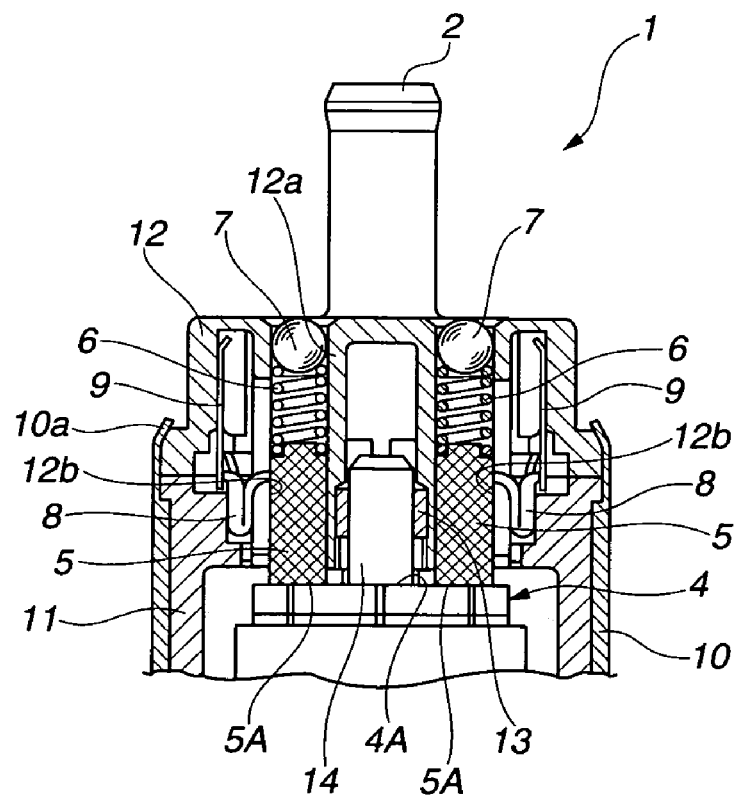
FIG. 3 is a fragmentary sectional view of the upper end section of the fuel pump of FIG. 2, taken generally along the plane indicated by lines A-A of FIG. 2.
Figure 4:
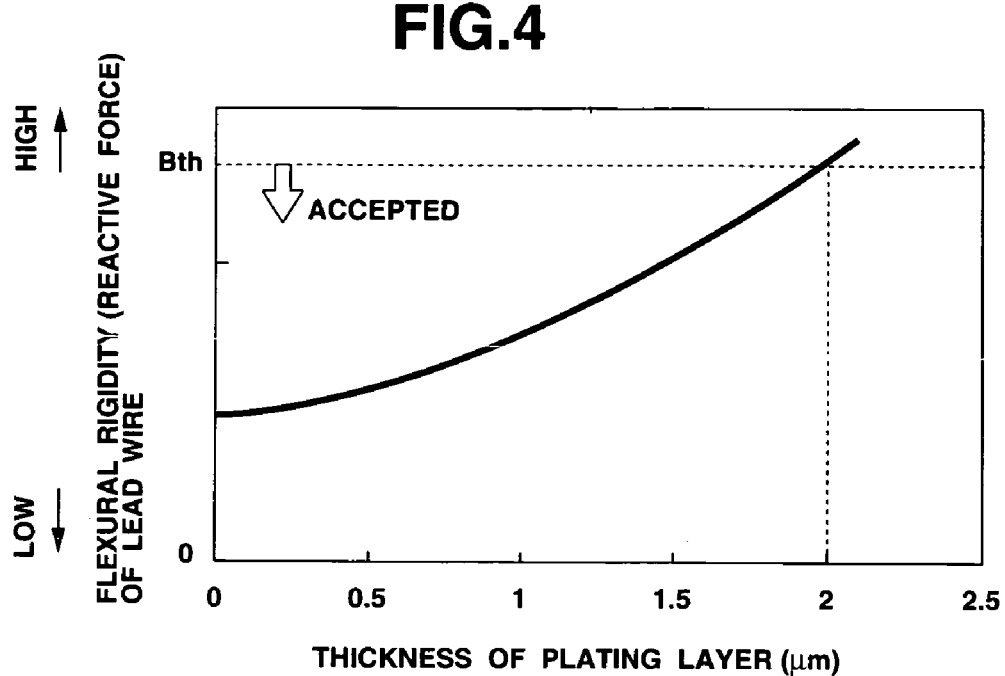
FIG. 4 is a graph of experimental data showing the correlation between a plating layer thickness of a lead wire, used in the fuel pump of FIG. 1 and a flexural rigidity of the lead wire.
Figure 5:
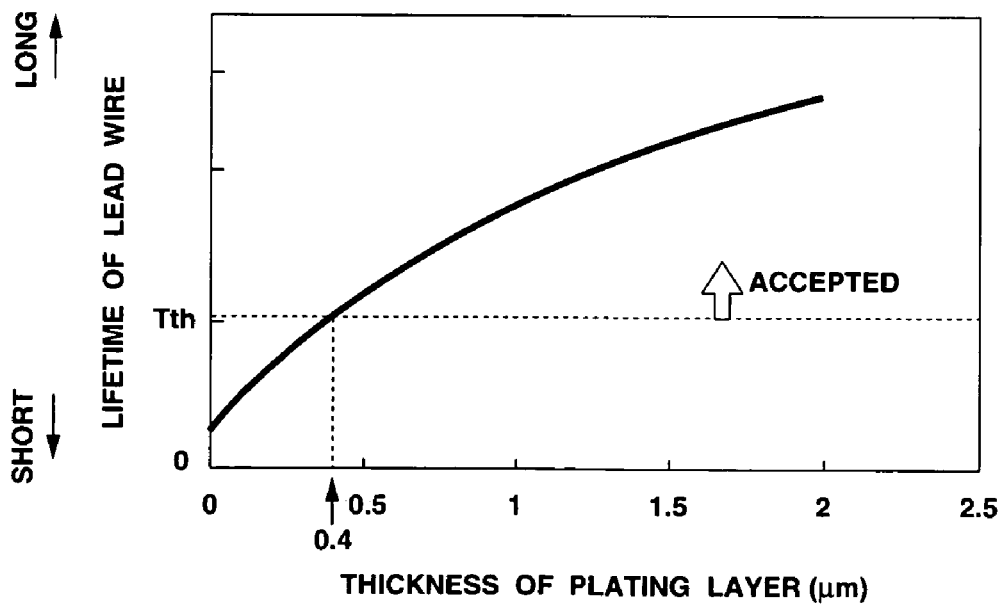
FIG. 5 is a graph of experimental data showing the correlation between a plating layer thickness of the lead wire used in the fuel pump of FIG. 1 and a lifetime of the lead wire.

Referring now to the accompanying drawings, an embodiment of a fuel pump according to the present invention will be discussed. FIG. 1 is a side view of the embodiment of the fuel pump according to the present invention. FIG. 2 is a plane view of an end or upper end section of the fuel pump which end section is formed with a discharge port. FIG. 3 is a fragmentary sectional view of the upper end section of the fuel pump, taken in the direction of arrows substantially along the line A-A of FIG. 2. FIG. 4 is a graph of experimental data showing the correlation between a plating layer thickness of a lead wire used in the fuel pump of FIG. 1 and a flexural rigidity (corresponding to a reactive force obtained by applying a certain deflection to the lead wire) of the lead wire. FIG. 5 is a graph of experimental data showing the correlation between a plating layer thickness of the lead wire used in the fuel pump of FIG. 1 and a lifetime of the lead wire, which is based on test results obtained by experiment in which the lead wire is dipped in a fuel containing sulfur. It will be understood that this embodiment is directed to the fuel pump used in a fuel supply system of an internal combustion engine for an automotive vehicle. Additionally, for convenience, upper and lower sides of the fuel pump discussed in this specification respectively correspond to upper and lower sides in FIGS. 1 and 3.

In fuel pump 1, fuel is sucked through a suction filter (not shown) from a suction port (not shown) and is discharged out of discharge port 2. The above fuel pump 1 is housed in a fuel tank and serves as a fuel supply apparatus (or as a component of the fuel supply apparatus) for supplying fuel in the fuel tank to a fuel injection valve.

Fuel pump 1 discussed in this embodiment includes hollow casing 10 in which a pump section (not shown) and an electric motor (only a part thereof shown) for operating or driving the pump section are formed.

The above casing 10 houses cylindrical body 11 therein. Cylindrical body 11 houses rotor 4 of the electric motor therein. Cover body 12 shaped like a cylinder with a lid is disposed on the upper side of cylindrical body 11. Cover body 12 is pressed or deformed together with open end portion 10a of casing 10 inwardly so that cover body 12 and cylindrical body 11 are fixed to casing 10.

Discharge port 2 to which a fuel tube or a piping is to be connected, and connector 3 for connecting an external power source such as a battery to the electric motor are formed on the upper surface of cover body 12.

Additionally, bearing cylindrical section or bearing sleeve 12a is formed inside cover body 12 and at the center of cover body 12. Shaft 14 (specifically, an upper end portion of shaft 14) of rotor 4 is journaled in bearing cylindrical section 12a through bearing 13.

Guide hole 12b which extends in an axial direction of shaft 14 is formed on the outer peripheral side of bearing cylindrical section 12a. Additionally, conductive member or metallic member 9 electrically connected to terminal 3a of connector 3 is disposed on the outer peripheral side of bearing cylindrical section 12a. Brush 5 is electrically connected to conductive member 9 through lead wire 8 and is loosely inserted in guide hole 12b to be vertically movable. The above lead wire 8 is in contact with fuel containing sulfur. Further, steel ball 7 is press-fitted in a mouth end section of guide hole 12b. Spring 6 (or a compression spring) serving as a biasing means is interposed between steel ball 7 and brush 5. Therefore, under the biasing force of spring 6, lower surface 5A of brush 5 is pressed against upper surface 4A of a commutator of rotatable rotor 4 to be brought into slidably contact with the above upper surface 4A. Upon contact of brush 5 with upper surface 4A of the commutator of rotatable rotor 4, electric current can be passed to a coil of the rotor.

With the above arrangement, as wear in lower surface 5A of brush 5 proceeds with use for a long period of time, brush 5 is gradually shortened in length; however, lower surface 5A of brush 5 is reliably brought into contact with upper surface 4A of the commutator of rotor 4 by the biasing force of spring 6 even if wear in brush 5 proceeds, so that a good electrical connection condition can be more reliably maintained at a contacting surface.

Further, lead wire 8 connected to brush 5 is bent generally U-shaped thereby obtaining a surplus length, and additionally lead wire 8 itself is formed flexible. With this, lead wire 8 never hinders movement of brush 5 when wear in brush 5 so proceeds as to shorten brush 5 and lead wire 8 deflects with the movement of brush 5. Therefore, lower surface 5A of brush 5 is more suitably brought into contact with upper surface 4A of the commutator of rotor 4, thereby more reliably maintaining the good electrical connection condition at the contacting surface.

In the above arrangement, electric power fed from the power source (or the battery) is supplied to rotor 4 (or the electric motor) through terminal 3a of connector 3, conductive member 9, lead wire 8, brush 5, and a slidably contacting surface between lower surface 5A of brush 5 and upper surface 4A of the commutator of rotor 4.

In this embodiment, a tin-electroplating is made on lead wire 8 in order to protect lead wire 8 from sulfidation or sulfurization due to sulfur in fuel. In the tin-electroplating, a wire material (or lead wire 8) is immersed in a plating solution under passage of electric current to the plating solution thereby depositing a plating material on a surface of the wire material so as to form a plating layer. With the electroplating, the thickness of the plating layer becomes uniform and suitably adjustable according to a current value, a time of the treatment of the electroplating, and the like. Further, the tin-electroplating is employed in this embodiment because the plating layer made of tin is more flexible than that formed by nickel plating, so that lead wire 8 can be prevented from hindering the movement of brush 5.

As a result of the present inventor's eager research and development made on the thickness of the plating layer, the following knowledge has been reached:

(a) If the plating layer is formed excessively thick, lead wire 8 becomes excessively high in flexural rigidity so as to hinder the movement of brush 5 to which lead wire 8 is connected, so that there arises a fear of occurrence of an abnormal wear of brush 5. As a result of tests, it has been found that a reactive force generating upon application of a certain degree of deflection to lead wire 8 became smaller than a threshold value Bth when the plating layer is formed to have a thickness not larger than 2 µm, as shown in FIG. 4. The threshold value Bth is a value at which a sufficient followability of brush 5 to upper surface 4A of the commutator can be obtained without raising any problems. Further, it has been found from FIG. 4 that it is more preferable to form the plating layer having a thickness of 1.5 µm.

(b) To the contrary, if the plating layer is formed excessively thin, there arises a fear that some portions may be sulfidized so as to degrade durability of lead wire 8. As a result of tests shown in FIG. 5, it has been found that when the plating layer was formed to have a thickness not smaller than 0.4 µm, the lifetime of lead wire 8 can be longer than an assumed or required lifetime Tth of fuel pump 1, so that a sufficient sulfidation resistance can be obtained.

According to the above-mentioned embodiment, the tin-electroplating is made on lead wire 8, so that dispersion in thickness of the plating layer can be minimized as compared with a case where the tin-plating by hot dipping is made on lead wire 8. Accordingly, lead wire 8 can be improved in durability against sulfidation. Additionally, the plating layer in accordance with this embodiment is formed to have a suitable thickness, thereby ensuring both sulfidation resistance and flexibility. Moreover, lead wire 8 according to the embodiment is bent, and therefore it can be further improved in flexibility.

Although the invention has been described above by reference to the embodiment of the invention, it will be understood that the invention is not limited to the embodiment described above. Modifications and variations of the embodiment described above will occur to those skilled in the art, in light of the above teachings.

Further, technical ideas grasped from the above embodiment will be discussed together with effects obtained therein.

(1) The fuel pump comprises a hollow casing in which a pump section and an electric motor for driving the pump section are disposed. A connector is provided for connecting the electric motor to an external power source, and has a terminal. A brush is slidably contacted with a rotor of the electric motor so as to supply power to a coil of the rotor. A lead wire is provided for electrically connecting the terminal of the connector to the brush. A plating layer of tin is formed on the lead wire by a tin-electroplating.

With this, dispersion in thickness of the plating layer can be minimized as compared with a case where the tin-plating by hot dipping is made on the lead wire. Accordingly, the lead wire can be improved in durability against sulfidation.

(2) In the fuel pump described in the idea (1), it is preferable to form the plating layer of the lead wire having a thickness within a range of from 0.4 to 1.5 µm.

With this, the lead wire can be improved in flexibility as compared with a case where the plating layer is formed to have a thickness of 2 µm, thereby obtaining an advantage of more reliably avoiding adverse affect on brush 5.

The entire contents of basic Japanese Patent Application P2005-123506 (filed Apr. 21, 2005) are incorporated herein by reference.

What is claimed is:
1. A fuel pump comprising:
a hollow casing;

a pump section disposed inside the casing;

an electric motor for driving the pump section disposed inside the casing;

a connector for connecting the electric motor to an external rower source, the connector having a terminal;

a brush slidably contacted with a rotor of the electric motor so as to supply power to a coil of the rotor, the brush being contacted with the rotor from an axial direction of the rotor, the brush being disposed generally parallel with the axial direction of the rotor and extending along the axial direction of the rotor;

a lead wire for electrically connecting the terminal of the connector to the brush, the lead wire being disposed between the brush and the connector;

an electroplated layer of tin on a surface of the lead wire, the electroplated layer having a final-manufactured thickness within a range of from 0.4 to 1.5 µm; and a fuel port for allowing fuel to flow between an internal and external environment of the fuel pump;

wherein the lead wire is more particularly a plurality of lead wires for electrically connecting the terminal of the connector to the brush, each of the lead wires being disposed outward from the fuel port in the radial direction of the fuel port between the brush and the connector; and wherein the electroplated layer of tin on the surface of each of the lead wires having a final-manufactured thickness within a range of from 0.4 to 1.5 µm.

2. A fuel pump as claimed in claim 1, wherein the lead wire with the electroplated layer is in contact with fuel containing a sulfur.

3. A fuel pump as claimed in claim 1, wherein the lead wire is formed bent to obtain its surplus length.

4. A fuel pump as claimed in claim 1, wherein the fuel pump forms part of a fuel supply system for an automotive internal combustion engine.

5. A method of producing a fuel pump including a hollow casing, a pump section disposed inside the casing, an electric motor for driving the pump section disposed inside the casing, a connector for connecting the electric motor to an external rower source, the connector having a terminal, a brush slidably contacted with a rotor of the electric motor so as to supply power to a coil of the rotor, the brush being contacted with the rotor from an axial direction of the rotor, the brush being disposed generally parallel with the axial direction of the rotor and extending along the axial direction of the rotor, and a lead wire for electrically connecting the terminal of the connector to the brush, the lead wire being disposed between the brush and the connector, the producing method comprising:

providing the lead wire having an electroplated layer of tin on a surface of the lead wire, the electroplated layer having a final-manufactured thickness within a range of from 0.4 to 1.5 µm; and wherein the fuel pump further including a fuel port for allowing fuel to flow between an internal and external environment of the fuel pump, and the lead wire is more particularly a plurality of lead wires for electrically connecting the terminal of the connector to the brush, the method comprising:

disposing each of the lead wires outward from the fuel port in the radial direction of the fuel port between the brush and the connector; and providing the electroplated layer of tin on the surface of each of the lead wires to have a final-manufactured thickness within a range of from 0.4 to 1.5 µm.

6. A fuel pump comprising:

a hollow casing;

a pump section disposed inside the casing;

an electric motor for driving the pump section disposed inside the casing;

a connector for connecting the electric motor to an external power source, the connector having a terminal;

a brush slidably contacted with a rotor of the electric motor so as to supply power to a coil of the rotor, the brush being contacted with the rotor from an axial direction of the rotor, the brush being disposed generally parallel with the axial direction of the rotor and extending along the axial direction of the rotor;

a lead wire for electrically connecting the terminal of the connector to the brush;

an electroplated layer of tin on a surface of the lead wire, the electroplated layer having a final-manufactured thickness within a range of from 0.4 to 1.5 µm; and a fuel port for allowing fuel to flow between an internal and external environment of the fuel pump;

wherein the lead wire is more particularly a plurality of lead wires for electrically connecting the terminal of the connector to the brush, each of the lead wires being disposed outward from the fuel port in the radial direction of the fuel port between the brush and the connector; and wherein the electroplated layer of tin on the surface of each of the lead wires having a final-manufactured thickness within a range of from 0.4 to 1.5 µm.

7. A fuel pump as claimed in claim 6, wherein the lead wire with the electroplated layer is in contact with fuel containing a sulfur.

8. A fuel pump as claimed in claim 6, wherein the lead wire is formed bent to obtain its surplus length.

9. A fuel pump as claimed in claim 6, wherein the fuel pump forms part of a fuel supply system for an automotive internal combustion engine.

* * * * *